United States Patent Office.

JAMES R. HASKELL, OF NEW YORK, N. Y.

Letters Patent No. 63,043, dated March 19, 1867.

---

IMPROVED MODE OF REDUCING VEGETABLE FIBROUS SUBSTANCES.

---

The Schedule referred to in these Letters Patent and making part of the same.

---

TO ALL WHOM IT MAY CONCERN:

Be it known that I, JAMES R. HASKELL, of the city, county, and State of New York, have invented a new and improved Mode of Treating Vegetable Fibrous Substances; and I do hereby declare that the following is a full and exact description of the same.

The nature of my invention consists of a cheap and expeditious mode of reducing vegetable fibrous substances, (especially cane, corn-stalks, and similar jointed structures,) to fibre to be used in the arts.

To enable others skilled in the art to use my invention, I will proceed to describe the operation of my process.

In treating cane, for example, it should be cut into suitable lengths, say about six feet long, and when it is large it should be split in halves.

First. I pass the cane between rollers for the purpose of flattening it and breaking out the gummy partitions at each joint.

Second. I then put the cane into a vat, boiler, or other suitable receptacle, and subject it to the action of steam for about one-half hour, more or less, for the purpose of softening the structure and opening and extending the pores or tubes of the plant.

Third. I then cover the cane with lime-water, being the cheapest alkaline solution, and steep or boil it for about four hours, more or less, for the purpose of further softening the structure of the cane, neutralizing any acid that may be contained in it, and as much as possible freeing it from gum and coloring matter.

Fourth. I next pass the cane between rollers for the purpose of squeezing out such mucilaginous substances as may have been eliminated by the action of the steam and lime-water, and also to spread out and disintegrate the fibres and prepare them for the action of more powerful chemical agents.

Fifth. I next steep or boil the material in a caustic alkaline solution, (at the rate of about ten pounds of caustic soda to each one hundred pounds of the material under treatment,) for about six hours, more or less, for the purpose of further freeing the fibre from gum and coloring matter.

Sixth. I then pass the material again betweeen rollers for the purpose of squeezing out the alkaline solution and further spreading out and separating the fibres.

If it is desired to bleach the product, it should be dried and pressed through a "willow," or similar machine for the purpose of shaking out the gum, when it can be bleached in the ordinary manner.

What I claim as my invention, and desire to secure by Letters Patent, is—

The combined process of treating vegetable fibrous substances consecutively and by relation of each process to the preceding and following process in the form and manner and for the purposes substantially as hereinbefore described.

JAMES R. HASKELL.

Witnesses:
W. W. DOWNING,
S. B. ELLIOTT.